United States Patent [19]
Byram et al.

[11] 3,715,005
[45] Feb. 6, 1973

[54] AUTOMATIC CRANKING SYSTEM FOR PROVIDING POWER ASSIST UPON VEHICLE ENGINE STALL

[75] Inventors: Robert J. Byram, Grand Blanc; Mark N. Culver, Davison; David L. Van Ostrom, Flint, all of Mich.

[73] Assignee: General Motors Corporation, Detroit, Mich.

[22] Filed: Sept. 1, 1971

[21] Appl. No.: 176,814

[52] U.S. Cl. ............180/103, 180/105 E, 123/179 K
[51] Int. Cl. .............................................B60k 13/00
[58] Field of Search............123/179 K; 180/103, 105

[56] References Cited

UNITED STATES PATENTS

| | | | |
|---|---|---|---|
| 2,934,054 | 4/1960 | Quinlan | 123/179 K |
| 3,647,016 | 3/1972 | Fitzsimons | 180/105 R |

*Primary Examiner*—Laurence M. Goodridge
*Attorney*—C. R. Meland et al.

[57] ABSTRACT

A system for energizing the vehicle engine starter motor when the vehicle engine stalls while the vehicle is at a speed greater than a predetermined minimum so as to maintain the operation of the vehicle engine driven accessories. A vehicle speed switch maintains the output of a summing junction, which output constitutes the input to a power switch, at ground so as to inhibit the power switch when the vehicle speed is below the predetermined speed and switches to supply a positive current signal to the summing junction at speeds equal to or greater than the predetermined speed. A vehicle engine speed tachometer supplies a negative current signal to the summing junction having a magnitude related to engine speed. The net current output of the summing junction when the vehicle engine speed is at or above the minimum engine idle speed, is insufficient to energize the power switch. When the engine speed decreases below the minimum idle speed, the net current output of the summing junction increases to energize the power switch which in turn energizes the vehicle starter solenoid. The vehicle starter motor cranks the vehicle engine so as to maintain the operation of the engine driven accessories while the vehicle speed is above the predetermined minimum speed.

2 Claims, 1 Drawing Figure

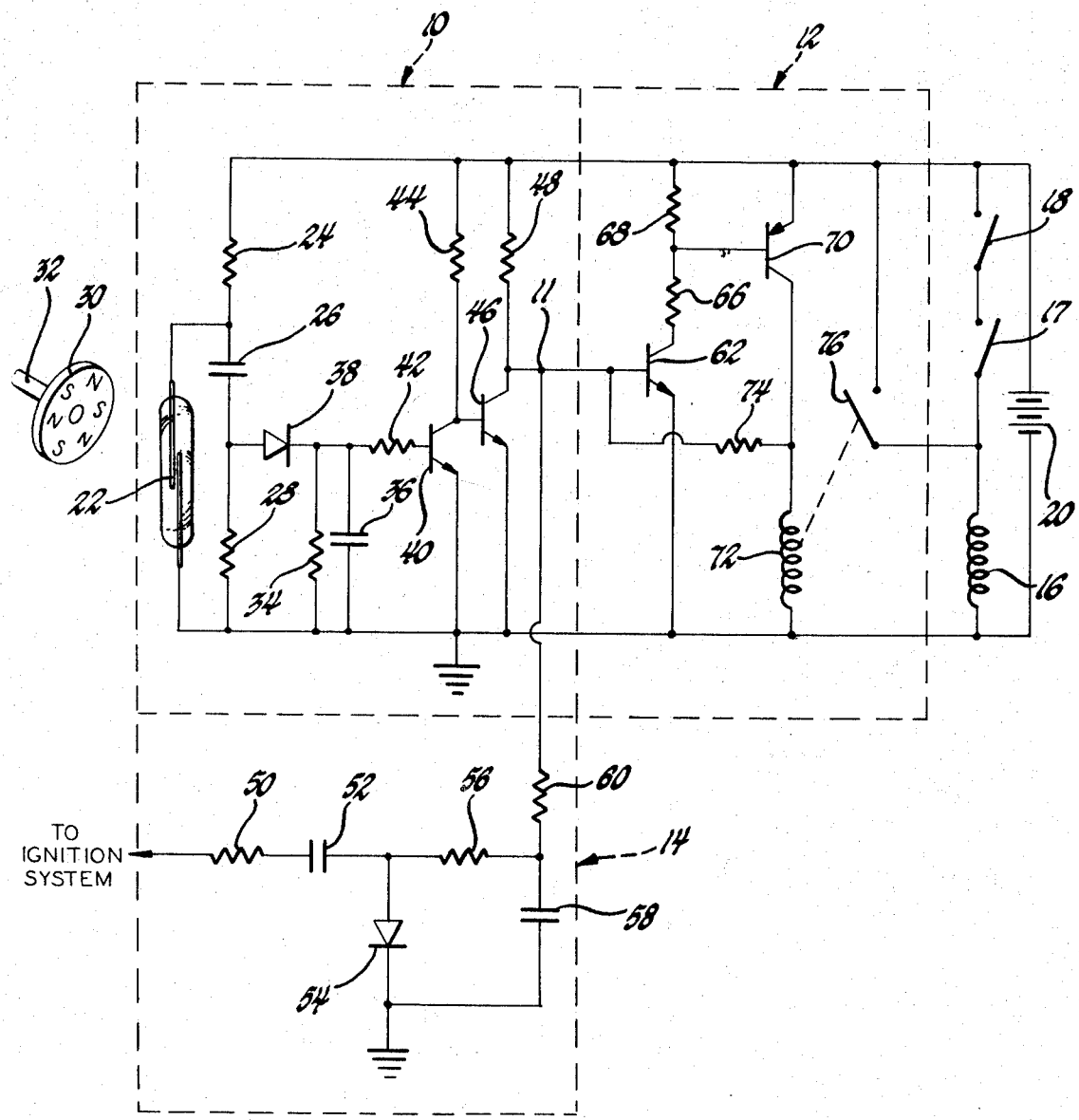

AUTOMATIC CRANKING SYSTEM FOR PROVIDING POWER ASSIST UPON VEHICLE ENGINE STALL

This invention relates to an automatic cranking system for a vehicle engine and, more specifically, this invention relates to an automatic cranking system for maintaining operation of vehicle engine powered accessories in the event of an engine stall while the vehicle is in motion.

Transmission fluid pumps for automatic transmissions of the type which are currently installed on automotive vehicles are driven by the vehicle engine. Consequently, when the vehicle engine stalls, the loss of transmission fluid pressure disables the transmission and prevents the engine from being driven by the drive wheels at speeds below about 30 MPH, through the drive train while the vehicle is in motion even though the transmission selector is in a drive gear. Therefore, in the event of an engine stall, the vehicle engine speed drops to zero which results in the loss of operation of the engine driven accessories, such as, for example, power steering assist. It is, therefore, one object of this invention to provide an automatic cranking system for energizing the vehicle starter motor upon the occurrence of an engine stall while the vehicle is in motion so as to maintain operation of the engine driven accessories.

Automotive vehicles are also currently manufactured with a neutral and park safety switch which prevents the energization of the starter motor solenoid when the vehicle transmission selector lever is in drive or reverse positions. It is an object of this invention to provide an automatic cranking system for energizing the vehicle starter motor when the vehicle engine stalls while the vehicle is moving above a predetermined minimum speed at all positions of the transmission selector lever and which does not replace the function of manual start when the vehicle is at rest including the requirement that the vehicle selector lever be placed in neutral or park position.

These and other objects of this invention are accomplished by means of a power switch to energize the vehicle starter solenoid. A vehicle speed switch inhibits the power switch when the vehicle speed is below a predetermined minimum and supplies a positive current signal to a summing junction when the vehicle speed is at or above the predetermined minimum speed. An engine tachometer supplies a negative current signal to the summing junction which is related to the speed of the engine. The output of the summing junction is the net between the two input signals, which net output is supplied to the power switch. When the speed of the engine is at or above the minimum idle speed, the net current output of the summing junction is insufficient to energize the power switch. When the engine speed decreases below the minimum idle speed, as occurs when the engine stalls, the net current output of the summing junction increases to energize the power switch which in turn energizes the vehicle starter solenoid. The vehicle starter motor then cranks the vehicle engine. The rotation of the vehicle engine by the starter motor drives the engine driven accessories until such time that the vehicle engine restarts and increases to a speed equal to or above the minimum idle speed or until the vehicle decreases below the predetermined minimum speed at which time the speed switch inhibits the power switch to deenergize the starter solenoid.

The invention may be best understood by reference to the following description of a preferred embodiment and the single figured drawing which is an electrical schematic of the preferred embodiment of this invention.

Referring to the drawing, there is shown a speed switch 10 which supplies a positive current signal to a summing junction 11 when the speed of the vehicle is at or above a predetermined minimum speed and supplies a ground signal to the summing junction 11 when the speed is below the predetermined minimum speed. The current output of the summing junction 11 is supplied to a power switch 12. The ground signal supplied to the junction point 11, when the vehicle speed is below the predetermined minimum, maintains the output of the junction point 11 at or below ground to inhibit the power switch 12. An engine tachometer 14 supplies to the summing junction 11 a negative current signal having a magnitude related to the speed of the vehicle engine. The power switch 12 is responsive to the sum of the positive current signal input from the speed switch 10 when the vehicle speed is at or above the predetermined minimum and the negative current signal input from the engine tachometer 14 to energize a vehicle starter motor solenoid 16 when the vehicle engine stalls.

The starter solenoid 16 can also be energized upon the closure of a park and neutral safety switch 17 and the vehicle ignition switch 18 which are connected in series with the vehicle starter motor solenoid 16 across the vehicle battery 20. The neutral and park safety switch 17 is responsive to the position of the vehicle transmission selector lever so as to be closed when the transmission selector lever is either in a park or neutral position. Consequently, the vehicle cannot be manually started by the closure of the ignition switch 18 without the transmission selector lever being in either park of neutral position.

The speed switch 10 includes a magnetically operated reed switch 22 in series with a current limiting resistor 24 across the vehicle battery 20. A differentiating capacitor 26 and a resistor 28 are connected in series with one another and in parallel with the magnetically operated reed switch 22. The reed switch 22 is positioned adjacent the face of a disk 30 which is rotated by an input shaft 32 which in turn is rotated by a member of the vehicle drive train such as, for example, a vehicle rear wheel. Consequently, the rate of rotation of the disk 30 is directly proportional to the speed of the vehicle. The disk 30 is magnetized so as to have alternating north and south magnetic poles therearound. Upon rotation of the disk 30, the reed switch 22 is alternately opened and closed thereby at a rate directly proportional to the speed of rotation of the input shaft 32 and, consequently, the speed of the vehicle.

When the reed switch 22 is opened, a voltage pulse is developed across the resistor 28 while the capacitor 26 is charging, which pulse is coupled to a filtering circuit including a resistor 34 and a capacitor 36 through a diode 38 and also to the base electrode of an NPN transistor 40 through the diode 38 and a resistor 42.

When the reed switch 22 is closed, the capacitor 26 discharges through the reed switch 22 and the resistor 28. The diode 38 prevents the capacitor 26 from discharging through the resistor 34 and the capacitor 36. As the reed switch 22 is alternately opened and closed by the rotation of the disk 30, the capacitor 36 is charged by the pulses coupled thereto through the diode 38 to a potential which is proportional to the rate of rotation of the disk 30 and, consequently, the speed of the vehicle.

The emitter electrode of the transistor 40 is connected to ground and the collector electrode thereof is connected to the positive terminal of the vehicle battery 20 through a resistor 44 and is connected to the base electrode of an NPN transistor 46. The emitter electrode of the transistor 46 is connected to ground and the collector electrode thereof is connected to the positive terminal of the vehicle battery 20 through a resistor 48. The output of the speed switch 10 is taken at the collector electrode of the transistor 46 which is connected to the summing junction 11.

When the speed of the vehicle is zero, the capacitor 36 is fully discharged to bias the transistor 40 into nonconduction. Consequently, the transistor 46 is biased into conduction with a resulting ground potential at the collector electrode thereof. As the speed of the vehicle increases, the capacitor 36 is charged to a potential directly related thereto as previously described. At a predetermined speed, as determined by the selection of the circuit element values, the charge on the capacitor 36 is sufficient to bias the transistor 40 into conduction to bias the transistor 46 into nonconduction. Consequently, positive current is supplied through the resistor 48 to the summing junction 11 from the speed switch 10 when the vehicle is above the predetermined speed.

The engine speed tachometer 14 receives an input from between the vehicle ignition points and primary winding of a conventional ignition coil (not shown). This input is coupled to ground through a resistor 50, a differentiating capacitor 52 and a diode 54, the cathode of the diode being connected to ground. A resistor 56 and a capacitor 58 are series connected and in parallel with the diode 54. The output signal of the engine speed tachometer 14 is taken from between the resistor 56 and the capacitor 58 and supplied to the summing junction 11 through a resistor 60 where it is summed with the output signal of the speed switch 10, the net between these two signals being supplied to the power switch 12.

Assuming the vehicle speed is greater than the predetermined minimum speed, when the vehicle ignition points are opened, the capacitor 52 charges from the vehicle battery 20 through the primary winding in the ignition circuit, the resistor 50 and to ground through the diode 54. When the ignition points are closed, the resistor 50 is grounded therethrough to discharge the capacitor 52 through the resistor 50, the capacitor 58 and the resistor 56 and also through the resistor 60 from the output of the speed switch 10. As can be seen, the positive current pulse developed when the capacitor 52 is charged is bypassed to ground through the diode 54 and the negative current pulse developed when the capacitor 52 is discharged is coupled to the capacitor 58 through the resistor 56 and to the summing junction 11 through the resistors 56 and 60. As viewed at the summing junction 11, the output of the engine speed tachometer 14 is a negative current signal having a minimum magnitude when the engine speed is zero and having a magnitude increasing therefrom as the engine speed increases. The net between this current signal and the output of the speed switch 10 constitutes the current input to the power switch 12. As previously indicated, when the vehicle speed is below the predetermined minimum, the input to the power switch 12 from the summing junction 11 is connected to ground through the transistor 46.

The net current input to the power switch 12 from the summing junction 11 is received at the base electrode of an NPN transistor 62 whose emitter electrode is connected to ground and whose collector electrode is connected to the positive terminal of the vehicle battery 20 through the resistor 66 and 68. The junction between the resistors 66 and 68 is connected to the base electrode of a PNP transistor 70 whose emitter electrode is connected to the positive terminal of the vehicle battery 20 and whose collector electrode is connected to ground through a relay coil 72 and to the base electrode of the transistor 62 through a feedback resistor 74. The relay coil 72 controls a set of normally open relay contacts 76 which are connected in parallel with the neutral and park safety switch 17 and the ignition switch 18.

The operation of the power switch 12 will now be described in conjunction with the speed switch 10 and the engine speed tachometer 14. When the speed of the vehicle is below the predetermined minimum speed, the summing junction 11 is maintained at ground potential by the speed switch 10. Consequently, the power switch 12 is inhibited as the transistors 62 and 70 are biased into nonconduction and the relay coil 72 is maintained deenergized. Therefore, the vehicle engine can only be started by positioning the transmission selector lever into neutral or park position to close the safety switch 17 and closing the ignition switch 18 to connect the starter motor solenoid 16 across the vehicle battery 20. When the vehicle engine has started, the summing junction 11 is maintained at ground potential through the transistor 46 in the speed switch 10. The power switch 12, therefore, remains inhibited. As the vehicle speed is thereafter increased to the predetermined minimum speed, the transistors 40 and 46 in the speed switch 10 are switched to thereafter supply a positive current input signal to the summing junction 11 through the resistor 48.

The negative current output signal of the engine speed tachometer 14 decreases the net output current of the summing junction 11 and, when the vehicle engine speed is greater than the minimum idle speed, is sufficient when summed with the positive current output signal from the speed switch 10 to reduce the net current input to the power switch 12 below the required input to bias the transistor 62 into conduction. Therefore, as long as the vehicle engine is running, the relay coil 72 in the power switch 12 is maintained deenergized. If the vehicle engine should stall and the engine speed decreases below the speed which represents the minimum idle speed, the negative current output signal from the engine speed tachometer 14 decreases with a decrease in the engine speed as previously described. When summed at the summing junction 11 with the positive current signal from the speed switch 10, the negative current signal is insufficient to maintain the transistor 62 in the power switch biased into nonconduction. Therefore, the transistors 62 and 70 are biased into conduction to energize the relay coil 72 to close the set of normally open relay contacts 76 and energize the starter motor solenoid 16. The starter motor is thereafter energized to crank the vehicle engine to maintain the operation of the engine driven accessories while the vehicle engine is stalled. The relationship between the positive and negative signals to accomplish the foregoing is obtained by proper selection of the circuit component values.

If the vehicle engine should start while the starter solenoid 16 is energized, the negative current output signal from the engine speed tachometer 14 increases to decrease the net input current signal to the power switch 12 from the summing junction 11. The net current input to the power switch 12 required to bias the transistor 62 into nonconduction is less than that required to bias it into conduction due to the feedback resistor 74 which supplies current to the base electrode of the transistor 62 when the transistor 70 is biased into conduction. Therefore, the vehicle engine speed must increase to the minimum idle speed before the net current input signal to the power switch 12 is decreased sufficiently to bias the transistors 62 and 70 into nonconduction. This hysteresis insures that the starter motor will not be energized until the vehicle engine has stalled and once the starter motor is energized, it will not drop out until the engine speed has returned to idle speed or until the vehicle speed drops below the predetermined minimum. If the vehicle engine does not start and the vehicle speed decreases to below the predetermined minimum speed, the transistors 40 and 46 in the speed switch 10 are switched to inhibit the power switch 12, as previously described, to deenergize the relay coil 72 and open the set of normally open relay contacts 76 to deenergize the starter motor solenoid 16. The predetermined minimum speed referred to can be any desired speed and may be, for example, two miles per hour.

In the foregoing manner, the engine driven accessories are operated during engine stall only during that period when such operation is required.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. An apparatus for maintaining the operation of motor vehicle engine driven accessories when the vehicle engine stalls while the vehicle speed is above a predetermined minimum, the motor vehicle including a starter motor for cranking the vehicle engine, comprising vehicle speed tachometer means responsive to the speed of the vehicle for generating an output proportional to said speed; bistable switching means connected to the vehicle speed tachometer means and responsive to the output of the last-mentioned means for switching to a first state when the speed of the vehicle is at or above a predetermined minimum speed and switching to a second state when the speed of the vehicle is below the predetermined minimum speed; engine speed tachometer means responsive to the speed of the engine for generating an output signal representing the speed of the engine; circuit means connected to the bistable switching means and the engine tachometer means and responsive to the output state of the bistable switching means and the output signal of the engine tachometer means for generating an inhibiting signal independent of the output signal from the engine tachometer means when the bistable switching means is in the second state and for generating an output signal representing the speed of the engine when the bistable switching means is in the first state; and starter motor energizing means connected to the circuit means and the starter motor and responsive to the output signal of the circuit means for energizing the starter motor so as to crank the vehicle engine when the output signal of the circuit means represents a vehicle engine stall and for maintaining the starter motor deenergized at all vehicle engine speeds when the circuit means generates an inhibiting signal, whereby the vehicle engine is cranked by the starter motor when the vehicle engine has stalled while the vehicle is above the predetermined minimum speed for maintaining the operation of the vehicle engine driven accessories.

2. An apparatus for maintaining the operation of motor vehicle engine driven accessories, the motor vehicle including a starter motor for cranking the vehicle engine, comprising vehicle speed tachometer means responsive to the speed of the vehicle for generating an output proportional to said speed, bistable switching means connected to the vehicle speed tachometer and responsive to the output thereof for switching to a first state and supplying an output signal having a first polarity when the speed is above a predetermined minimum speed and switching to a second state when the speed is below the predetermined minimum speed; engine speed tachometer means responsive to the speed of the engine for generating an output signal proportional to said speed at a second polarity opposite the first-mentioned polarity; summing means connected to the bistable switching means and the engine speed tachometer means and responsive to the outputs thereof for supplying an inhibiting signal when the bistable switching means is in the second state and for supplying a signal representing the sum of the output signal from the bistable switching means when the bistable switching means is in the first state and the output signal of the engine speed tachometer means, said signal being a representation of the speed of the vehicle engine; and energizing means connected to the summing means and the vehicle starter motor and responsive to the output of the summing means for energizing the starter motor when the output signal of the summing means represents a vehicle engine stall and maintaining the starter motor deenergized when the output signal of the summing means represents a vehicle engine speed greater than the engine stall speed, the energizing means being inhibited by the inhibiting signal at the output of the summing means so as to maintain the starter motor deenergized at all vehicle engine speeds when the speed of the vehicle is below the predetermined minimum, whereby the vehicle engine starter motor is energized to crank the vehicle engine for maintaining the operation of the vehicle engine driven accessories when the vehicle engine stalls while the vehicle speed is above the predetermined minimum speed.

* * * * *